United States Patent [19]

Boden et al.

[11] Patent Number: 4,714,579
[45] Date of Patent: Dec. 22, 1987

[54] METHOD AND AN APPARATUS FOR THE PRODUCTION OF SHAPED ARTICLES

[75] Inventors: Heinrich Boden, Leverkusen; Walter Schneider, Overath, both of Fed. Rep. of Germany

[73] Assignee: Bayer Aktiengesellschaft, Bayerwerk, Fed. Rep. of Germany

[21] Appl. No.: 870,586

[22] Filed: Jun. 4, 1986

[30] Foreign Application Priority Data

Jun. 22, 1985 [DE] Fed. Rep. of Germany ....... 3522377

[51] Int. Cl.$^4$ .................... B29C 45/67; B29C 67/22; C08G 18/08
[52] U.S. Cl. ................... 264/328.6; 264/40.5; 264/51; 264/331.19; 264/DIG. 83; 425/156; 425/160; 425/543; 425/590; 425/817 R
[58] Field of Search ............ 264/DIG. 83, 54, 53, 264/48, 45.5, 51, 40.5, 331.19, 328.6; 425/156, 160, 543, 590, 817 R

[56] References Cited

U.S. PATENT DOCUMENTS

| | | | |
|---|---|---|---|
| 3,056,168 | 10/1962 | Terry | 264/55 |
| 3,253,066 | 5/1966 | Hardy et al. | 264/51 |
| 3,291,873 | 12/1966 | Eakin | 264/55 X |
| 3,342,913 | 9/1967 | Engel | 264/48 |
| 3,468,990 | 9/1969 | Odell | 264/54 X |
| 3,632,729 | 1/1972 | Bielfeldt | 264/DIG. 83 |
| 3,981,671 | 9/1976 | Edwards | 264/DIG. 83 |
| 4,139,177 | 2/1979 | Hanning | 264/DIG. 83 |
| 4,153,231 | 5/1979 | Hayakawa et al. | 264/DIG. 83 |
| 4,188,356 | 2/1980 | Weber et al. | 264/DIG. 83 |
| 4,256,679 | 3/1981 | Osinski et al. | 264/51 |
| 4,314,955 | 2/1982 | Boden et al. | 264/51 |
| 4,379,104 | 4/1983 | Koorevaar | 264/45.5 |
| 4,579,700 | 4/1986 | Cavender | 264/53 X |

Primary Examiner—Philip Anderson
Attorney, Agent, or Firm—Gene Harsh; Joseph C. Gil; Lyndanne M. Whalen

[57] ABSTRACT

Plastics-forming materials are shaped in a mold tool sealed by an associated closing unit. Lifting elements the stroke of which can be limited and controlled are associated with the mold tool. Shaping is accomplished by filling the mold cavity with reaction mixture while the mold tool halves are not completely sealed, sealing the filled mold and keeping the mold sealed until the article is completely cured. This method and apparatus are particularly useful in the production of dimensionally accurate geometrically complicated shaped articles.

12 Claims, 4 Drawing Figures

METHOD AND AN APPARATUS FOR THE PRODUCTION OF SHAPED ARTICLES

BACKGROUND OF THE INVENTION

The present invention relates to a method and an apparatus for the production of shaped articles.

Production of shaped articles which are formed in a mold tool in a manner which avoids sink marks or other surface defects has long been sought by those in the art. In such a molding process a build up of dwell pressure is necessary in many cases, in particular with the so-called RIM (reaction injection molding) method. There have been attempts to produce this dwell pressure by charging the reaction mixture exceedingly strongly with gas. However, this measure only produces the desired effect of avoiding surface defects with shaped articles having wall thicknesses greater than about 2.5 mm. With long flow paths, however, and during passage through mold cavity portions of reduced thickness, the back pressure produced causes undesirable partial dissolution of the gases in the reaction mixture. As a result, the dissolved gas is no longer available for pressure compensation during the very rapid solidification of the reaction mixture and the reaction shrinkage occurring.

If the admission rate is too slow or the filling time too long, the viscosity begins to increase during introduction of the mixture due to the initiation of the solidification reaction with a build up of pressure preferably in the gate region. A uniform build up of dwell pressure of, for example, 70 bar or higher during the curing process cannot be achieved with this type of dwell pressure control.

There have also been attempts to adopt suitable over-filling techniques for cell-forming reaction mixtures. However, the shaped article material has an undesirably high density, and a considerable quantity of material is wasted due to the over-filling. Less rigid mold tools and closure units have been used with this method in order to utilize the swelling thereof. Strong, irregular expulsion, the low closing pressure and difficultly reproducible dimensional accuracy prevented the mass production of high quality shaped articles. Due to the low pressure level attainable, the formation of bubbles on the surface of the shaped article could not be reliably prevented in the region of sharp-edged transitions.

There have also been attempts (DE-OS No. 28 29 016 corresponding to U.S. Pat. Ser. No. 4,256,679) to use a storage piston which is arranged between the mixer head and the actual mold cavity. In this process, the mold cavity is enlarged by the storage volume before introduction of the mixture and pressure is then applied, creating an elevated pressure. Markings on the shaped article cannot be avoided. This dwell pressure control is also impaired by penetration and solidification of the reaction mixture in the sealing gap between piston and storage cylinder. This technique cannot be adopted for geometrically complicated or for long shaped articles because the propagation of pressure over the entire mold cavity is not ensured due to progressive solidification.

There have also been attempts (EP-PS No. 24 610 corresponding to U.S. Pat. Ser. No. 4,314,955) to use mold tools with elastic internal wall regions which regions can be charged from the rear. The disadvantage of these mold tools resides in the fact that uniform heating and cooling of the elastic wall regions causes problems. A further draw-back lies in the fact that the dimensional accuracy of the shaped articles is not ensured.

SUMMARY OF THE INVENTION

It is an object of the present invention to provide a method and an apparatus in which the necessary dwell pressure is applied in the mold tool in such a way that geometrically complicated (particularly, long) shaped articles true to shape and dimensions can be produced without defects. It is also an object of the invention to provide a molding method and apparatus therefore in which conventional tolerances in the quantity of filling can be adopted. It is a further object of the invention to provide a molding method and apparatus in which fast reacting reaction mixtures can be processed successfully.

These and other objects which will be apparent to those skilled in the art are achieved by positioning a mold tool in a first position in which the shaping surfaces of the mold cavity lying perpendicularly to the closing movement are brought to a distance from one another which is at most 5 mm greater than the distance in the final closed position. The mold tool halves are maintained in this position during the charging process. The mold tool halves are brought into the final closed position only on completion of the charging process.

DETAILED DESCRIPTION OF THE INVENTION

Figure 1:
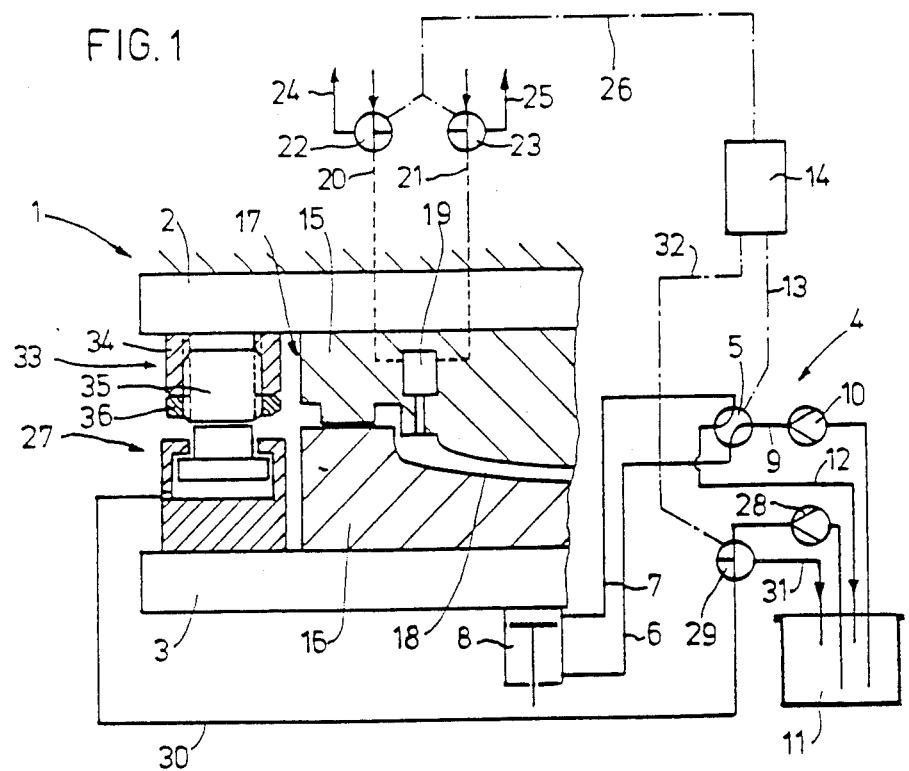
FIG. 1 illustrates one embodiment of an apparatus within the scope of the present invention in which hydraulic piston cylinder units are arranged on a base plate of the closing unit as lifting elements.

The present invention relates to a method and apparatus for the production of shaped articles from materials which react to form solid or microcellular plastics such as polyurethane-forming flowable reaction mixtures formed from at least two flowable reaction components. In this invention, a mold tool is sealed by an associated closing unit. Reaction mixture is introduced before the mold is completely sealed. After introduction of the reaction mixture is complete, the mold is completely sealed and a pressure higher than that which prevailed during filling of the mold is built up. The mold tool is kept closed until the shaped article is cured. The mold is then opened and the shaped article removed.

Before beginning the charging process, the mold tool is preferably brought into a first position in which the shaping surfaces of the mold cavity lying perpendicularly to the closing movement are brought to a distance no greater than 5 mm from one another, preferably to a distance between 0.01 mm and 1 mm greater than the closed position.

This technique makes it possible to use rigid, dimensionally stable mold tools in which the inherent rigidity is sufficiently great for the mold cavity not to be subjected to deformation or to be subjected only to negligible deformation under the influence of pressure from the exterior or interior. The dimensional accuracy of the shaped articles produced is thus ensured by the mold tool. By driving into the final closed position, it is possible to build up a higher, optionally controllable dwell pressure. The difference between dwell pressure and pressure during the charging process can be from 7 to about 70 bar in normal cases or even much higher pressure (to about 250 bar) if necessary. As a rule, the introduced reaction mixture in the still plastically deformable state substantially fills the mold cavity under the closing pressure of the closing unit. The dwell pressure is produced by the movement of the mold tool halves into the final closed position due to the associated reduction in the volume of the mold cavity. The size of the stroke between the first position and final closing position and the time control thereof depend on factors such as the size and geometry of the mold cavity, the possible degree of foaming of the reaction mixture and the shrinkage of the chemical material. The final closed position can be achieved, for example, once the chemical shrinkage and a proportion of the physical shrinkage have become effective.

The method of the present invention can basically be carried out with any closable mold tool having a closing unit. If a greater gap is required during the charging process, it is advantageous to use a so-called immersion edge tool. Such tools are generally known. A characteristic of these tools is that the edge profile forms a slide seal parallel to the closing movement in the shaping region of one mold tool half with the edge profile in the shaping region of the other mold tool half. The size of the "gap" to be left between the two mold tool halves during the charging process can best be determined by tests for each mold tool or each chemical system to be processed. The optimum gap depends substantially on the thickness and density of the resulting shaped article. The force required for maintaining and closing the "gap" can be applied mechanically, pneumatically or hydraulically. A person skilled in the art will prefer the hydraulic solution because it is the most flexible method of building up the dwell pressure and for altering the dwell pressure in a predetermined manner and because hydraulic energy is available in most closing units.

The final closing movement during introduction of the mixture is preferably prevented by an opposing force which exceeds the closing force of the closing unit and which is reduced once introduction of the mixture is terminated.

This embodiment is particularly suitable for hydraulic operation and the procedure can be controlled and regulated very well automatically.

The associated apparatus for producing shaped articles from a material which forms a solid or microcellular plastic (in particular a polyurethane-forming flowable reaction mixture of at least two flowable reaction components) is based on a closing unit with a mold tool and mixing apparatus for the reaction components, one tool half being allocated to a respective base plate of the closing unit.

The novelty of this apparatus lies in the fact that the mold tool is allocated lifting elements which act against the closing force of the closing unit during introduction of the mixture and the stroke of which can be limited and controlled over time.

This allows the lifting elements to keep the mold tool halves in a position during introduction of the mixture, which position allows a suitable increase in the volume of the mold cavity. Substantially any commercially available closing units are suitable as closing unit for the new apparatus. The known mold tools with add-on mixing apparatus, mounted mixer head or integrated mixer head can also be used for this purpose. Mechanically tensionable eccentric levers, adjustable screw bolts and the like can be used as lifting elements.

However, the lifting elements are preferably composed of short stroke hydraulic units with pistons and cylinders. Alternatively, the lifting elements may be composed of hydraulic cushions.

Both hydraulic designs allow rapid and reliable application of the necessary force while allowing easy intervention by the control program.

In a particular embodiment, the lifting elements may be arranged on the closing unit and fixed on one of the two base plates to act on the other one.

The lifting elements are preferably arranged on one base plate and adjustable support elements on the other base plate. This enables the closing unit to be used for mold tools of different heights and, moreover, allows the necessary height of the "gap" between the mold tool halves to be adjusted during introduction of the mixture by means of the adjustable support elements. It goes without saying that the gap height can also be defined by other measures such as spacer plates or adjustable stops connected directly to the hydraulic piston.

As an alternative, the lifting elements may be integrated in the mold tool. Lifting elements which are designed in the form of add-on blocks and are fixed directly on the mold tool are equivalent to this embodiment. This embodiment is advantageous with mold tools of large surface area because lifting elements can be brought as close as possible to the mold cavity thereby keeping the undesirable deformation of the mold tool to a minimum.

The force generating system for the lifting elements is preferably coupled to the force generating system for the closing unit, and both systems may be connected in terms of control to the program transmitter in the control device of the mixing apparatus. The molding procedure can be automated with this embodiment of the apparatus. The control device firstly actuates the force generating system for the closing unit and then the force generating system for the lifting elements or vice versa. As soon as the mold tool halves have assumed the preliminary closing position for the charging process, the mixing apparatus is actuated and the reaction mixture is charged into the mold cavity. After a predetermined time interval which is adapted to the quantity of mixture to be produced, the mixing apparatus is turned off again.

A further time relay in the control device may be adjusted to a predetermined time interval, on completion of which the control device disengages the force generating system of the lifting elements so that the mold tool halves are brought into the final closing position by the closing force generated in the closing unit and thus produce the desired dwell pressure. If a change is desired in the dwell pressure, it can be made both by suitable staggered control of the hydraulic closing pressure and of the supporting pressure. A further time relay may be adjusted to the curing time of the shaped article. Once this curing time interval has expired, the force generating system of the closing unit is actuated to open the mold tool. The next cycle can begin after the shaped article has been removed.

Alternatively, closing units with a hydraulic or articulated lever closing mechanism are also suitable. When such mechanisms are employed, the mold closing process can take place in two stages with hydraulic pressure cushions being used to build up the high pressure in the second stage.

The attached drawings show the new apparatus purely schematically in several embodiments in a vertical section in outline and are described in more detail below.

FIG. 1 shows an apparatus in which hydraulic piston cylinder units are arranged on a base plate of the closing unit as lifting elements.

In FIG. 1, a closing unit 1 is composed of two base plates 2, 3 and hydraulic force generating system 4. The force generating system 4 is made up of piston cylinder unit 8 connected to a change-over valve 5 via lines 6, 7. A line 9 leads to a hydraulic pump 10 which draws from a reservoir 11. A discharge line 12 leads from the change-over valve 5 back into the reservoir 11. The change-over valve 5 is connected via a pulse line 13 to a control device 14.

The mold tool halves 15, 16 of mold tool 17 designed as immersion edge tool and enclosing a mold cavity 18 are clamped on the base plates 2, 3. A mixing device 19 for mixing the reaction components polyol and isocyanate is shown as being integrated into the upper mold tool half 15. Mixing devices of this type, in whose mixing chamber an ejection piston is preferably guided, are generally known to those in the art so a more detailed explanation is unnecessary. The mixing device 19 also comprises the supply lines 20, 21 with change-over valves 22, 23 from which return lines 24, 25 lead to storage containers (not shown). The change-over valves 22, 23 are connected via a pulse line 26 to the control device 14.

Lifting elements 27 of which only one is shown are arranged at regular intervals round the mold tool 16 on the base plate 3. They are designed as hydraulic piston cylinder units which can be charged via a supply line system 30 equipped with a change-over valve 29 using a hydraulic pump 28. The supply line 30 can be relieved via a return line 31 by actuating the change-over valve 29. The change-over valve 29 is connected via a pulse line 32 to the control device 14. Adjustable supporting elements 33 are arranged on the other base plate 2 opposite the lifting elements 27. These supporting elements 33 are composed of a screw threaded sleeve 34 which is fixed on the base plate 2 and a supporting bolt 35 provided with a screw thread guide. The supporting bolt 35 is provided with a counter-nut 36. Using this counter-nut 36, it is possible to adjust the height of the effective end of the supporting bolt 35 to the height of the mold tool 17, at the same time, to adjust the position of the first preliminary position, i.e. the height of the mold cavity 18 before the dwell pressure sets in.

Figure 2:
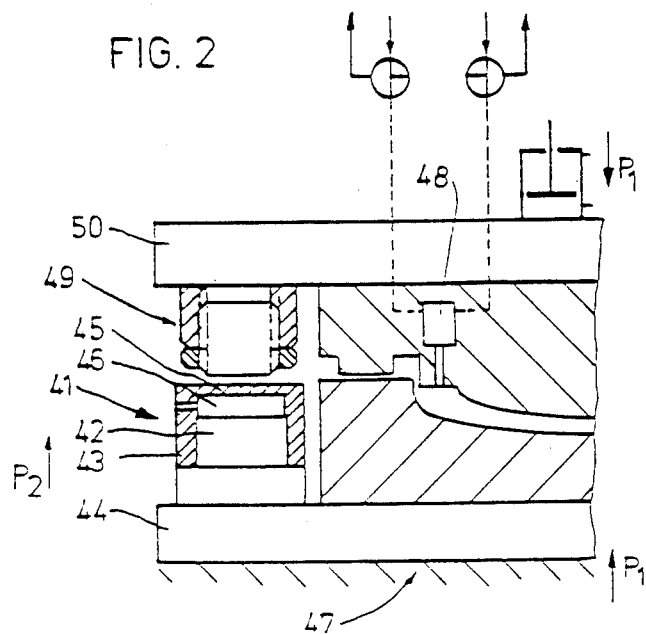
FIG. 2 illustrates an apparatus within the scope of the claimed invention in which hydraulic pressure cushions are arranged on a base plate of the closing unit as lifting elements.

FIG. 2 shows an apparatus in which hydraulic pressure cushions are arranged on a base plate of the closing unit as lifting elements.

In the apparatus according to FIG. 2, only the hydraulic cylinder units acting as lifting elements in the apparatus of FIG. 1 are replaced by hydraulic pressure cushions 41. Each pressure cushion 41 is made up of a sealing piston 42 with housing 43 both of which are fixed on the base plate 44. The housing 43 has an elastically deformable end wall 45 which bulges accordingly when the hydraulic chamber 46 located beneath it is charged with pressure. The force generating systems (not shown) for the lifting elements 41 and the closing unit 47 as well as the control device and the mixing device 48 correspond to the design shown in FIG. 1. Similarly constructed supporting elements 49 are also arranged on the other base plate 50 in this case. The design of the supporting elements corresponds to that shown in FIG. 1.

Figure 3:
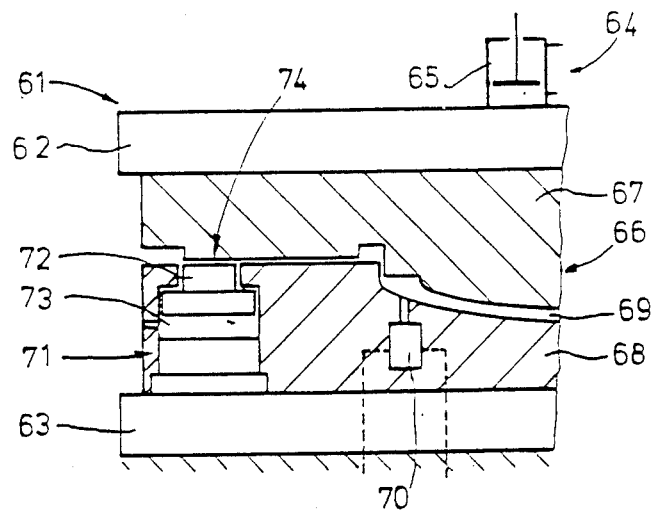
FIG. 3 illustrates an apparatus in which hydraulic piston cylinder units are integrated into the mold tool as lifting elements.

FIG. 3 shows an apparatus in which hydraulic piston cylinder units are integrated into the mold tool as lifting elements.

The apparatus according to FIG. 3 corresponds in principle to the embodiment shown in FIG. 1 with the exception that the lifting elements are integrated into the mold tool. The apparatus is made up of a closing unit 61 with base plates 62, 63. A force generating system 64 is made up of a hydraulic piston with cylinder 65. In the closing unit 61, a mold tool 66 is arranged between the base plate 62, 63 and is composed of the mold tool halves 67, 68 between which a mold cavity 69 is enclosed. A mixing device 70 is integrated in the lower mold tool half 68. Lifting elements designed as piston cylinder units 71 of which only one is shown are also fitted therein. A hydraulic chamber 73 is arranged behind the short stroke piston 72. The force generating system for the lifting elements 71 and the control device with control system are not shown but they correspond to those shown in FIG. 1. The short stroke piston 72 operates directly on a supporting surface 74 of the upper mold tool half 67.

Figure 4:
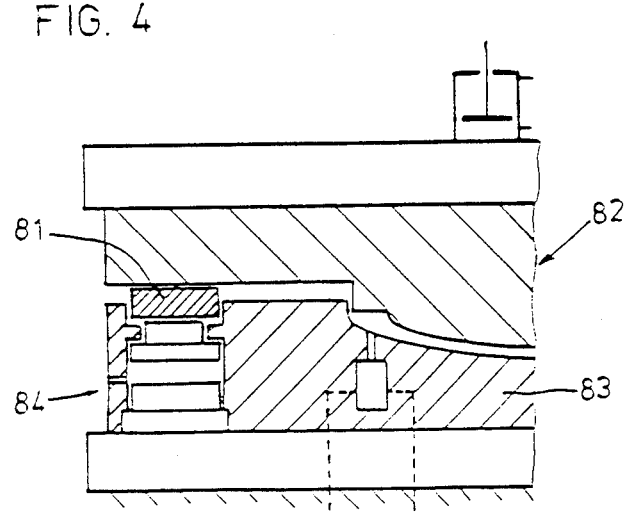
FIG. 4 illustrates an apparatus in which hydraulic piston cylinder units with spacer plates are integrated into the mold tool as lifting elements.

FIG. 4 shows an apparatus in which hydraulic piston cylinder units with additional spacer plates are integrated into the mold tool as lifting elements.

In the apparatus illustrated in FIG. 4 a spacer plate 81 which optionally runs round in the separating plane of the mold tool 82 is provided and is guided in sealed manner in a corresponding groove in the lower mold tool half 83. The lifting elements 84 act directly on the spacer plate 81. Otherwise, the design of this apparatus corresponds to the design shown in FIG. 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for producing shaped articles in which:
    (a) a mold tool is placed in a first position in which the shaping surfaces of the mold tool are brought together but are not completely closed to a distance of up to 5 mm from the closed position,
    (b) introducing a reaction mixture into the molded tool,
    (c) completely closing the mold tool when the mold is filled with reaction mixture,
    (d) building up the pressure in the closed mold tool,
    (e) curing the article thus-molded,
    (f) opening the mold tool and,
    (g) removing the molded article from the mold tool.

2. The method of claim 1 in which the shaping surfaces are brought towards one another to a distance of from 0.01 mm to 1 mm from the closed position in (a).

3. The method of claim 1 in which the closing in (c) is carried out in several stages.

4. The method of claim 1 in which final closing of the mold is prevented during (b) by a counterforce exceeding the closing force which counterforce is reduced upon completion of step (b).

5. An apparatus for producing shaped articles from a reactive mixture comprising:
   (a) a mold tool having two halves,
   (b) lifting elements associated with mold tool (a) the stroke of which can be limited and controlled, and
   (c) a closing unit having two base plates each of which is associated with one or the other mold tool half in which lifting elements (b) act against the closing force of closing unit (c) during introduction of the reactive mixture.

6. The apparatus of claim 5 in which the lifting elements (b) are hydraulic units with piston and cylinder.

7. The apparatus of claim 5 in which the lifting elements (b) are hydraulic pressure cushions.

8. The apparatus of claim 5 in which the lifting elements (b) are arranged on the closing unit (c).

9. The apparatus of claim 5 in which the lifting elements (b) are arranged on one of the base plates of closing unit (c) and adjustable supporting elements (d) are arranged on the other base plate of closing unit (c).

10. The apparatus of claim 5 which further comprises (e) a force generating system for lifting elements (b), (f) a force generating system for closing unit (c) and (g) a mixing device with a programmer for material to be fed into the mold tool (a).

11. The apparatus of claim 10 which further comprises (h) a control device associated with the programmer of mixing device (g).

12. The apparatus of claim 11 in which the force generating systems (e) and (f) are connected to the programmer of mixing device (g).

* * * * *